(12) United States Patent
Hattori et al.

(10) Patent No.: US 9,771,031 B2
(45) Date of Patent: Sep. 26, 2017

(54) METALLIC DECORATIVE PART FOR VEHICLE DISPLAY DEVICE, AND VEHICLE DISPLAY DEVICE

(71) Applicant: Yazaki Corporation, Tokyo (JP)

(72) Inventors: Tatsuya Hattori, Shizuoka (JP); Sunao Fujita, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/295,999

(22) Filed: Oct. 17, 2016

(65) Prior Publication Data

US 2017/0106813 A1    Apr. 20, 2017

(30) Foreign Application Priority Data

Oct. 19, 2015  (JP) .................................. 2015-205789

(51) Int. Cl.
*B60K 35/00*   (2006.01)
*B60R 13/02*   (2006.01)
(Continued)

(52) U.S. Cl.
CPC .......... *B60R 13/0256* (2013.01); *B60K 35/00* (2013.01); *B60K 37/02* (2013.01); *G01D 13/04* (2013.01)

(58) Field of Classification Search
CPC ........ B60K 35/00; B60K 37/02; G01D 13/04; B60R 13/0256
(Continued)

(56) References Cited

U.S. PATENT DOCUMENTS

2008/0123322 A1* 5/2008 Tane ..................... B60K 35/00
                                                    362/23.01
2011/0163864 A1* 7/2011 Watanabe ............. B60K 35/00
                                                    340/441
(Continued)

FOREIGN PATENT DOCUMENTS

DE    10 2012 107 247 A1    2/2013
JP        2007-232403 A     9/2007
(Continued)

OTHER PUBLICATIONS

Decision to Grant a Patent dated Jan. 8, 2016 in corresponding JP2015-205789 (with English Translation).
(Continued)

*Primary Examiner* — Ricky D Shafer
(74) *Attorney, Agent, or Firm* — Kenealy Vaidya LLP (57) ABSTRACT

A metallic decorative part for a vehicle display device includes: a substrate body molded from synthetic resin; a metal thin film formed of metal and deposited on a surface of the substrate body; and a mirror surface formed on a surface of the metal thin film in accordance with a surface shape of the substrate body. The mirror surface is formed such that, in a waviness curve obtained from the surface shape with a cutoff value defined as 250 μm, and in terms of a ratio between an amplitude as an average height of a waviness waveform and a wavelength as an average length of the waviness waveform, the ratio of the wavelength to the amplitude of 1 is equal to or greater than 600 and equal to or smaller than 6000, and mirror surface roughness is greater than 0 and equal to or smaller than 0.35 μm.

5 Claims, 6 Drawing Sheets

(51) Int. Cl.
*B60K 37/02* (2006.01)
*G01D 13/04* (2006.01)

(58) Field of Classification Search
USPC .............................................. 359/868; 180/90
See application file for complete search history.

(56) References Cited

U.S. PATENT DOCUMENTS

| | | | |
|---|---|---|---|
| 2013/0040090 A1 | 2/2013 | Sakurai | |
| 2015/0079289 A1 | 3/2015 | Sakurai | |
| 2015/0379773 A1* | 12/2015 | Konishi | B60Q 3/044 |
| | | | 345/633 |
| 2016/0238418 A1* | 8/2016 | Fujita | B60K 37/02 |
| 2016/0252373 A1* | 9/2016 | Fujita | G01D 13/04 |
| 2016/0368381 A1* | 12/2016 | Ogawa | B60K 35/00 |
| 2017/0106628 A1* | 4/2017 | Hattori | B32B 15/08 |
| 2017/0106810 A1* | 4/2017 | Hattori | B60K 35/00 |

FOREIGN PATENT DOCUMENTS

| | | |
|---|---|---|
| JP | 2013-40773 A | 2/2013 |
| JP | 2015-87379 A | 5/2015 |
| JP | 5748930 B1 | 5/2015 |
| JP | 2015-114229 A | 6/2015 |
| WO | 2015/076327 A1 | 5/2015 |
| WO | 2015/088017 A1 | 6/2015 |
| WO | 2016/143065 A1 | 9/2016 |

OTHER PUBLICATIONS

German Office Action for the related German Patent Application No. 10 2016 220 409.2 dated May 12, 2017.

* cited by examiner

| | FIRST COMPARATIVE EXAMPLE | SECOND COMPARATIVE EXAMPLE | THIRD COMPARATIVE EXAMPLE | FOURTH COMPARATIVE EXAMPLE | FIRST EXAMPLE | SECOND EXAMPLE | PRESENT METAL |
|---|---|---|---|---|---|---|---|
| WAVINESS Wc:Wsm | 1:181 | 1:482 | 1:524 | 1:556 | 1:659 | 1:1460 TO 2920 | 1:2560 TO 5850 |
| MIRROR SURFACE ROUGHNESS Ra [μm] | 1.714 | 1.271 | 0.696 | 0.368 | 0.336 | 0.296 | 0.259 |
| EVALUATION VALUE | 70 | 80 | 90 | 90 | 100 | 120 | — |

METALLIC DECORATIVE PART FOR VEHICLE DISPLAY DEVICE, AND VEHICLE DISPLAY DEVICE

CROSS-REFERENCE TO RELATED APPLICATION(S)

The present application claims priority to and incorporates by reference the entire contents of Japanese Patent Application No. 2015-205789 filed in Japan on Oct. 19, 2015.

BACKGROUND OF THE INVENTION

1. Field of the Invention

The present invention relates to a metallic decorative part for a vehicle display device, and to a vehicle display device.

2. Description of the Related Art

Japanese Patent Application Laid-open No. 2007-232403, for example, discloses a decorative member for a vehicle instrument as a known metallic decorative part for a vehicle display device to be applied to a vehicle display device. The metallic decorative part includes a substrate, a primer layer, and a metal coating. The substrate is formed of a light-transmissive material and a display design is formed thereon. The primer layer and the metal coating are stacked in sequence on portions of the substrate excluding a front surface of the substrate and a front surface of the display design.

The decorative member for a vehicle instrument disclosed in Japanese Patent Application Laid-open No. 2007-232403 needs further improvement to exhibit more appropriate metallic texture.

SUMMARY OF THE INVENTION

The present invention has been made in view of the foregoing situation and it is an object of the present invention to provide a metallic decorative part for a vehicle display device, and a vehicle display device, that can achieve appropriate metallic texture to be given to a viewer in a configuration including a metal thin film on a surface of a substrate body formed of resin.

In order to achieve the above mentioned object, a metallic decorative part for a vehicle display device according to one aspect of the present invention includes a substrate body molded from synthetic resin; a metal thin film that is formed of metal and deposited on a surface of the substrate body; and a mirror surface that is formed on a surface of the metal thin film in accordance with a surface shape of the substrate body, wherein the mirror surface is formed such that, in a waviness curve obtained from the surface shape of the mirror surface with a cutoff value of 250 µm, a ratio of a wavelength to an amplitude, when the amplitude is 1, is equal to or greater than 600 and equal to or smaller than 6000, and mirror surface roughness of the mirror surface is greater than 0 and equal to or smaller than 0.35 µm, the amplitude being an average height of a waviness waveform in the waviness curve and the wavelength being an average length of the waviness waveform.

According to another aspect of the present invention, in the metallic decorative part for a vehicle display device, it is preferable that the mirror surface is formed such that the ratio of the wavelength to the amplitude, when the amplitude is 1, is equal to or greater than 1000 and equal to or smaller than 6000, and the mirror surface roughness of the mirror surface is greater than 0 and equal to or smaller than 0.35 µm.

According to still another aspect of the present invention, in the metallic decorative part for a vehicle display device, it is preferable that the mirror surface is formed such that the ratio of the wavelength to the amplitude, when the amplitude is 1, is equal to or greater than 1400 and equal to or smaller than 6000, and the mirror surface roughness of the mirror surface is greater than 0 and equal to or smaller than 0.30 µm.

According to still another aspect of the present invention, a vehicle display device includes a display unit that displays information relating to a vehicle; a metallic decorative part for a vehicle display device that includes a substrate body molded from synthetic resin; a metal thin film that is formed of metal and deposited on a surface of the substrate body; and a mirror surface that is formed on a surface of the metal thin film in accordance with a surface shape of the substrate body, wherein the mirror surface is formed such that, in a waviness curve obtained from the surface shape of the mirror surface with a cutoff value of 250 µm, a ratio of a wavelength to an amplitude, when the amplitude is 1, is equal to or greater than 600 and equal to or smaller than 6000, and mirror surface roughness of the mirror surface is greater than 0 and equal to or smaller than 0.35 µm, the amplitude being an average height of a waviness waveform in the waviness curve and the wavelength being an average length of the waviness waveform.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes in detail a preferred embodiment according to the present invention with reference to drawings. The embodiment is, however, presented by way of example only and is not intended to limit the scope of the invention. Additionally, components of the embodiment include those that can be replaced by those skilled in the art and simple or substantially identical ones.

Embodiment

Figure 1:
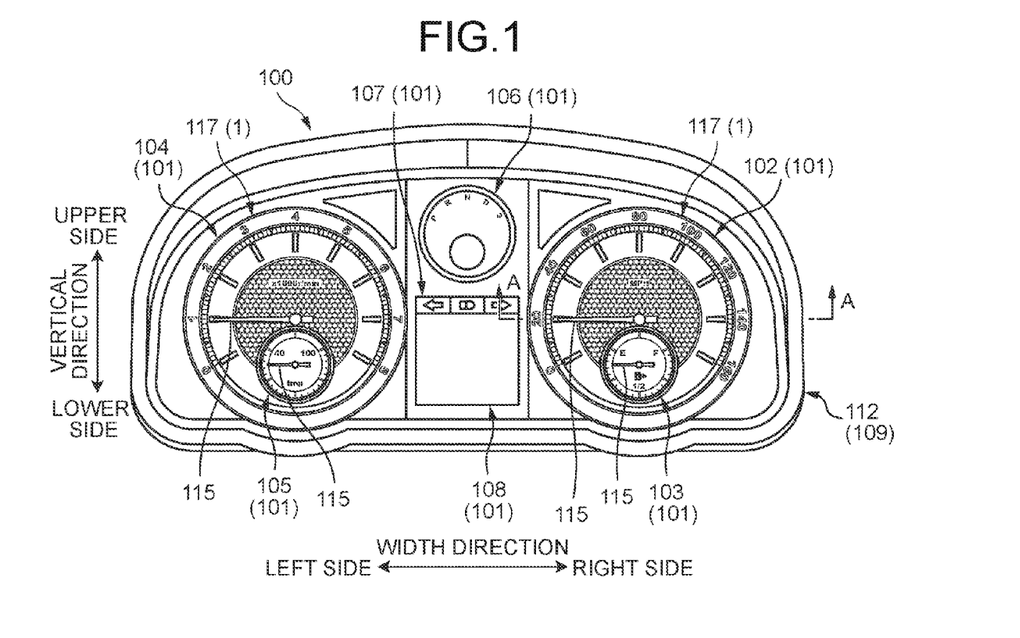
FIG. 1 is a front elevational view illustrating a schematic configuration of a vehicle display device according to an embodiment.
Figure 2:
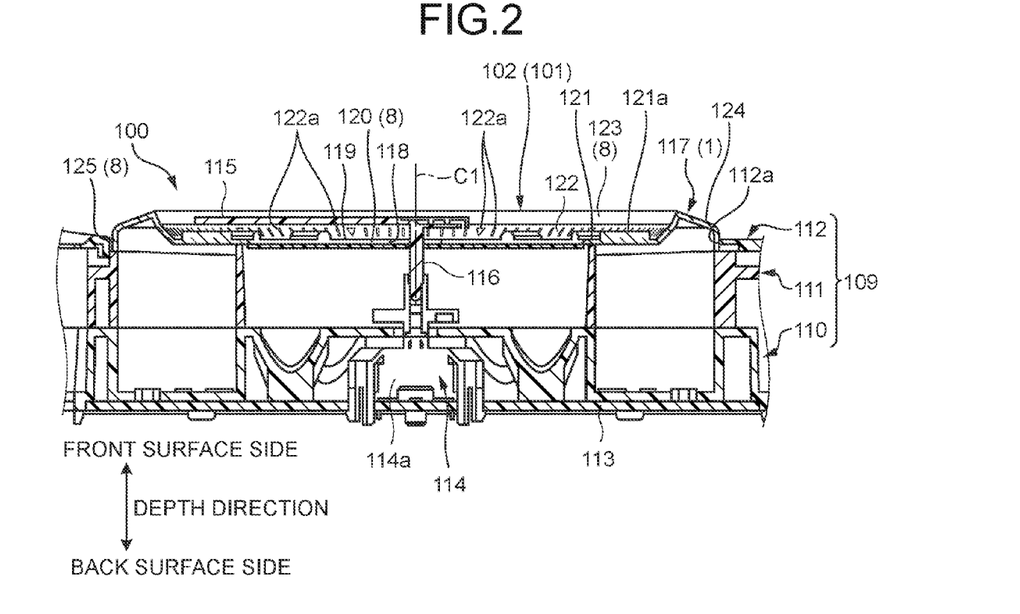
FIG. 2 is a partial cross-sectional view taken along line A-A in FIG. 1.
Figure 3:
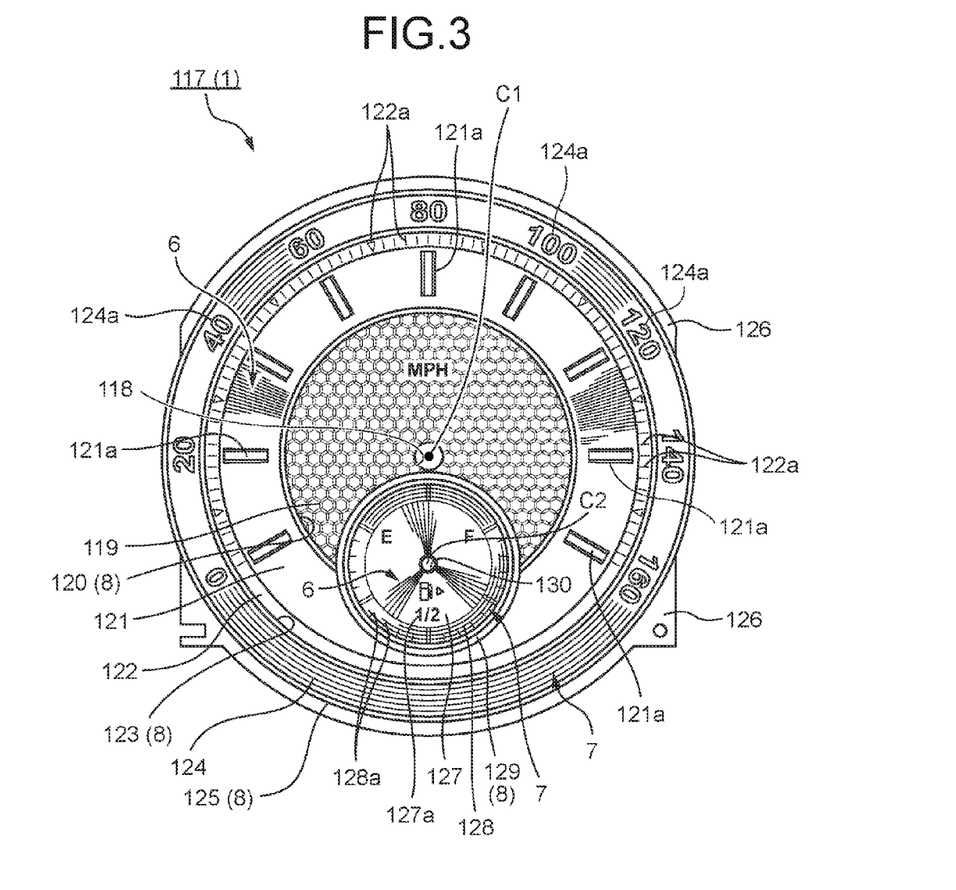
FIG. 3 is a front elevational view illustrating a schematic configuration of a dial plate to be applied to the vehicle display device according to the embodiment.
Figure 4:
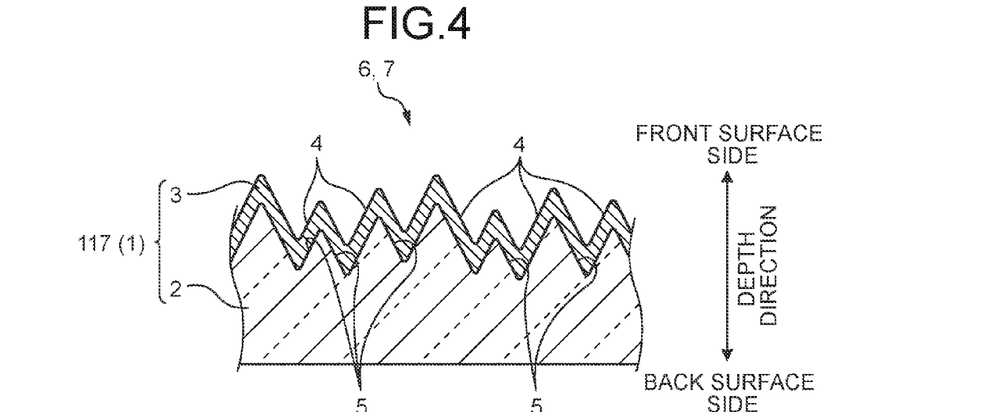
FIG. 4 is a schematic cross-sectional view illustrating a schematic configuration of the dial plate to be applied to the vehicle display device according to the embodiment.
Figure 5:
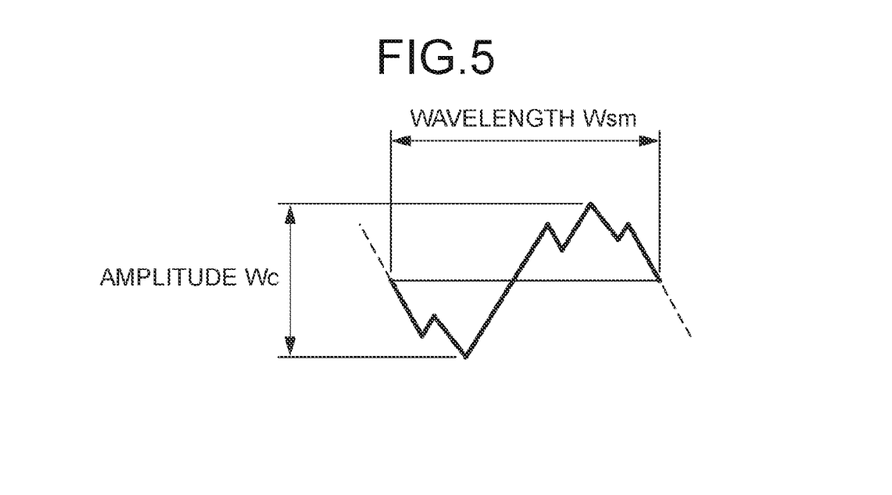
FIG. 5 is a schematic view illustrating a waviness waveform occurring on a surface of a mirror surface.
Figure 6:
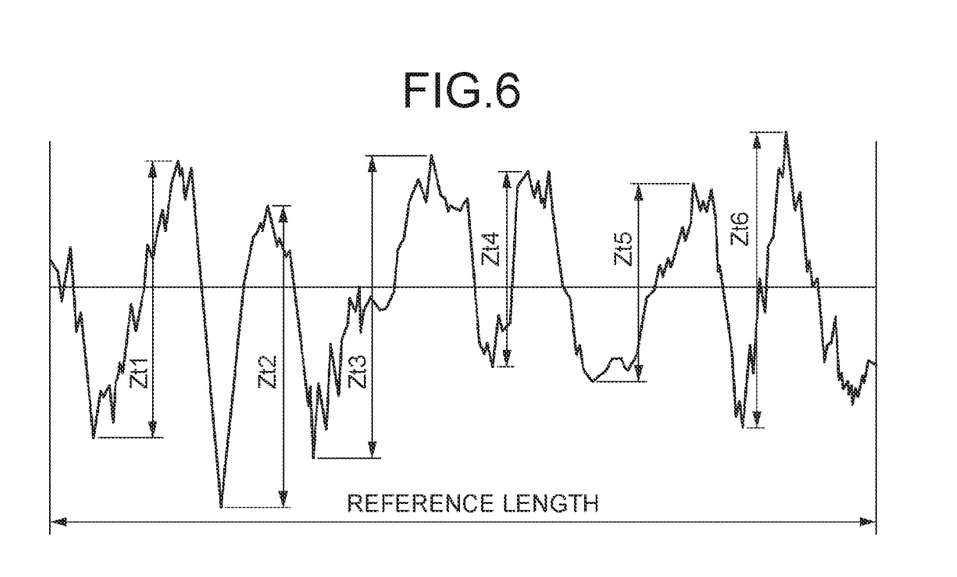
FIG. 6 is a diagram illustrating how to find an average height of a waviness curve.
Figure 7:
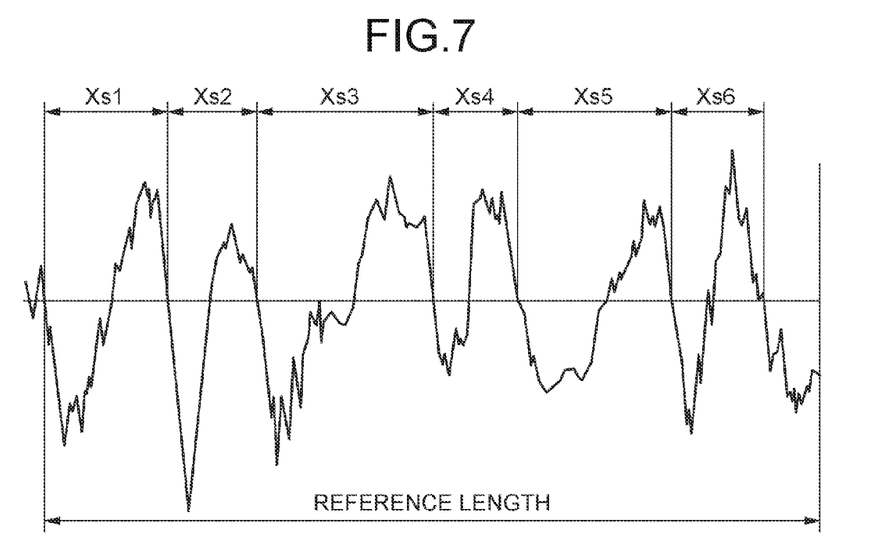
FIG. 7 is a diagram illustrating how to find an average length of the waviness curve.
Figure 8:
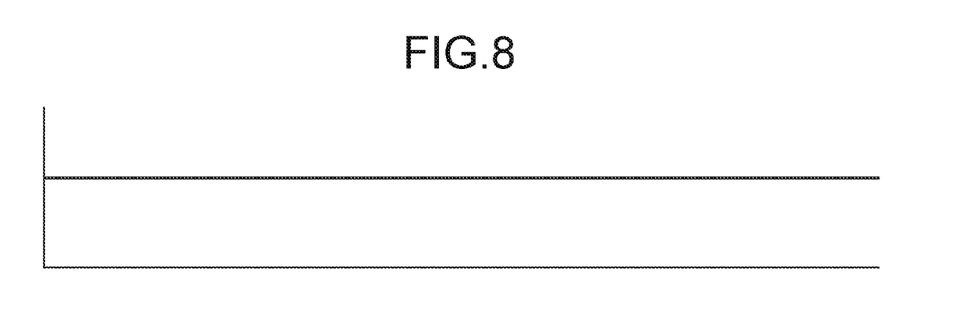
FIG. 8 is a diagram illustrating exemplary measurement data of the waviness curve relating to the dial plate to be applied to the vehicle display device according to the embodiment.
Figure 9:
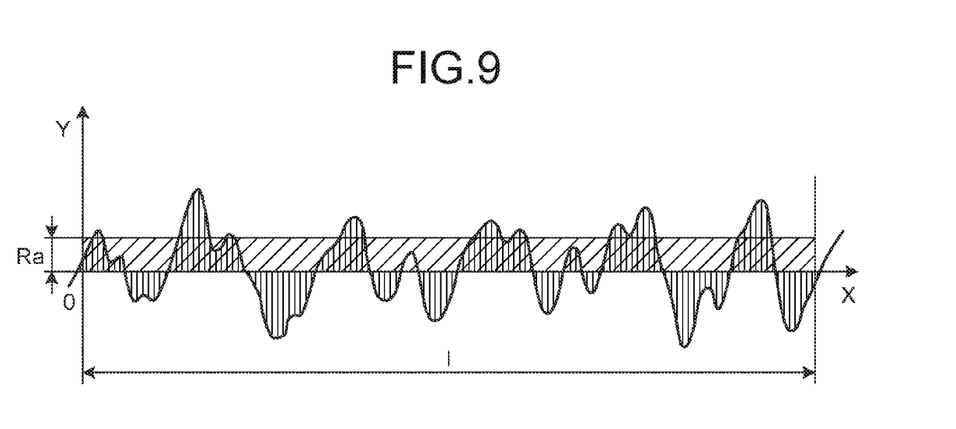
FIG. 9 is a diagram illustrating how to find arithmetic average roughness.
Figure 10:
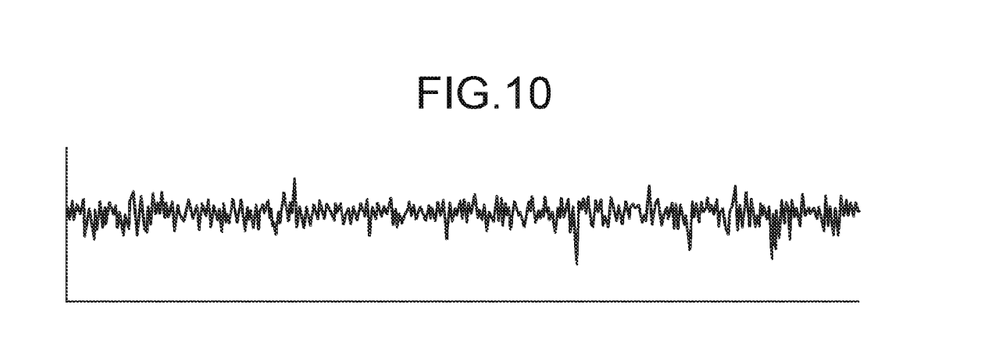
FIG. 10 is a diagram illustrating exemplary measurement data of a roughness curve relating to the dial plate to be applied to the vehicle display device according to the embodiment.

FIG. 1 is a front elevational view illustrating a schematic configuration of a vehicle display device according to an embodiment. FIG. 2 is a partial cross-sectional view taken along line A-A in FIG. 1. FIG. 3 is a front elevational view illustrating a schematic configuration of a dial plate to be applied to the vehicle display device according to the embodiment. FIG. 4 is a schematic cross-sectional view illustrating a schematic configuration of the dial plate to be applied to the vehicle display device according to the embodiment. FIG. 5 is a schematic diagram illustrating a waviness waveform occurring on a surface of a mirror surface. FIG. 6 is a diagram illustrating how to find an average height of a waviness curve. FIG. 7 is a diagram illustrating how to find an average length of the waviness curve. FIG. 8 is a diagram illustrating exemplary measurement data of the waviness curve relating to the dial plate to be applied to the vehicle display device according to the embodiment. FIG. 9 is a diagram illustrating how to find arithmetic average roughness. FIG. 10 is a diagram illustrating exemplary measurement data of a roughness curve relating to the dial plate to be applied to the vehicle display device according to the embodiment.

As illustrated in FIGS. 1 and 2, decorative parts 1 as metallic decorative parts for a vehicle display device according to the embodiment are applied to a vehicle display device 100 that is mounted on a vehicle. The vehicle display device 100 constitutes what is called an in-vehicle meter. The vehicle display device 100 is mounted, for example, in an instrument panel disposed on a dashboard of the vehicle. The vehicle display device 100 displays various types of information relating to the vehicle, serving for operation of the vehicle. The vehicle display device 100 includes display units 101 and the decorative parts 1. The display units 101 display information relating to the vehicle. The decorative parts 1 are incorporated into different parts of the vehicle display device 100 including the display units 101. The vehicle display device 100 is configured such that the decorative parts 1 each include a metal thin film 3 affixed to a surface of a substrate body 2 formed of resin. The metal thin film 3 is formed into a predetermined shape to thereby give a viewer appropriate metallic texture.

It is noted that the vehicle display device 100 illustrated in FIG. 1 has a width direction that typically corresponds to the width direction of the vehicle to which the vehicle display device 100 is applied. In the following, the left-hand side facing the front surface of the vehicle display device 100 (left side in FIG. 1) may be referred to, in the width direction of the vehicle display device 100, as the left side in the width direction and the right-hand side facing the front surface of the vehicle display device 100 (right side in FIG. 1) may be referred to, in the width direction of the vehicle display device 100, as the right side in the width direction. In addition, the vehicle display device 100 illustrated in FIG. 2 has a depth direction that typically corresponds to the anterior-posterior direction of the vehicle to which the vehicle display device 100 is applied. Additionally, the vehicle display device 100 has a front surface side that faces a driver's seat of the vehicle and that typically corresponds to a side viewed by a driver sitting in the driver's seat. The vehicle display device 100 has a back surface side that is opposite in the depth direction to the front surface side and that is typically a side housed inside the instrument panel.

The display units 101 display various types of information relating to the vehicle. The display units 101 include, exemplarily as the information relating to the vehicle, a speedometer 102, a fuel indicator 103, a tachometer 104, a coolant temperature indicator 105, a shift indicator 106, a turn indicator 107, and a multi-display 108. Specifically, the speedometer 102 indicates a vehicle speed. The fuel indicator 103 indicates a level of fuel still available for use. The tachometer 104 indicates output speed of a traveling drive power source. The coolant temperature indicator 105 indicates the temperature of coolant. The shift indicator 106 indicates a shift position. The turn indicator 107 indicates an operating condition of a turn signal indicator (winker). The multi-display 108 displays other types of auxiliary driving information. The display units 101 are disposed inside a housing 109 that houses different parts of the vehicle display device 100. The display units 101 have display surfaces of various types of information exposed on the front surface side in the depth direction. The housing 109 is formed, for example, of a resin material. The housing 109 includes, for example, a back surface case 110, an intermediate case 111, and a facing 112. The back surface case 110 is disposed on the back surface side in the depth direction. The intermediate case 111 is disposed on the front surface side in the depth direction of the back surface case 110. The facing 112 is disposed on the front surface side in the depth direction of the intermediate case 111. The display units 101 are disposed inside the space defined by the back surface case 110, the intermediate case 111, and the facing 112. In the housing 109, each of the display units 101 has a display surface exposed on the front surface side in the depth direction via an opening 112a (refer to FIG. 2) formed in the facing 112. The display units 101 are configured such that the fuel indicator 103 has a display surface incorporated in a display surface of the speedometer 102 and the coolant temperature indicator 105 has a display surface incorporated in a display surface of the tachometer 104. The display units 101 are configured such that, in the housing 109, the speedometer 102 and the fuel indicator 103 are disposed on the right side in the width direction, the tachometer 104 and the coolant temperature indicator 105 are disposed on the left side in the width direction, and the shift indicator 106, the turn indicator 107, and the multi-display 108 are disposed in the middle therebetween.

As illustrated in FIG. 2, the speedometer 102, for example, includes an internal mechanism 114 that is fixed to a wiring board 113 disposed inside the housing 109. The internal mechanism 114 includes a motor 114a that serves as a drive source for a needle pointer 115. The needle pointer 115 includes a rotational shaft 116 provided in a protruding manner from the motor 114a. The fuel indicator 103, the tachometer 104, and the coolant temperature indicator 105 are configured substantially similarly to the speedometer 102. The facing 112 covers the wiring board 113 and the internal mechanism 114, for example. The facing 112 allows each of the display units 101 (the speedometer 102, the fuel indicator 103, the tachometer 104, the coolant temperature indicator 105, the shift indicator 106, the turn indicator 107, the multi-display 108, and the like) to have display surfaces exposed on the front surface side in the depth direction via the opening 112a as described above. It is noted that the vehicle display device 100 has the front surface side in the depth direction of the respective display units 101 protected by a transparent cover fitted to the housing 109.

The decorative parts 1 serve as ornamental members for portions that are, in the vehicle display device 100, exposed on the front surface side in the depth direction and visible from occupants including the driver. The decorative parts 1 are applied to dial plates 117 incorporated in, for example, the respective display units 101, such as the speedometer 102, the fuel indicator 103, the tachometer 104, and the coolant temperature indicator 105. The dial plates 117 constitute display surfaces exposed on the front surface side in the depth direction from the opening 112a in, for example, the speedometer 102, the fuel indicator 103, the tachometer 104, and the coolant temperature indicator 105. The dial plate 117 includes decoration of a scale pointed by the needle pointer 115 and decoration of various patterns, symbols, character strings, and the like relating to measured values assigned to the corresponding scale.

The following illustrates the dial plates 117 incorporated in the speedometer 102 and in the fuel indicator 103 incorporated in the display surface of the speedometer 102, with reference to, for example, FIGS. 2, 3, and 4. It is noted that the dial plates 117 incorporated in the tachometer 104 and in the coolant temperature indicator 105 incorporated in the display surface of the tachometer 104 are similarly configured.

The dial plate 117 configured as the decorative part 1 has a surface of the front surface side in the depth direction constituting a display surface. The dial plate 117 is generally formed into a substantially circular shape. The dial plate 117 has a shaft hole 118 formed in an area that includes a central axis C1 of the substantially circular shape, and receives the rotational shaft 116 of the needle pointer 115 of the speedometer 102 passed therethrough. The shaft hole 118 passes through the dial plate 117 in the depth direction. The shaft hole 118 is formed into a substantially circular shape about the central axis C1. The dial plate 117 includes a center disc section 119, a boundary rising surface 120, a speedometer main scale section 121, a speedometer auxiliary scale section 122, a frame wall 123, a speedometer character display section 124, and a cylindrical end section 125 that are formed concentrically about the central axis C1 in sequence outwardly in a radial direction from the shaft hole 118 side into substantially annular rings. The dial plate 117 functions such that the speedometer main scale section 121, the speedometer auxiliary scale section 122, the speedometer character display section 124, and the like constitute a portion corresponding to the display surface of the speedometer 102.

The center disc section 119 is formed into a substantially annular ring on the outside in the radial direction of the shaft hole 118. The center disc section 119 is formed in a honeycomb mesh. A character string is disposed on the center disc section 119 to denote, for example, a unit of a physical quantity indicated by the speedometer 102, in this case "MPH", for example. The boundary rising surface 120 is connected with the outside in the radial direction of the center disc section 119 and formed into a substantially annular ring. The boundary rising surface 120 is formed as a substantially cylindrical riser surface that protrudes from the center disc section 119 to the front surface side in the depth direction along the central axis C1. The speedometer main scale section 121 is connected with the outside in the radial direction of an end portion on the front surface side in the depth direction of the boundary rising surface 120 and formed into a substantially annular ring. The speedometer main scale section 121 is associated with the physical quantity indicated by the speedometer 102, specifically, the vehicle speed. The speedometer main scale section 121 includes a plurality of main scales 121a pointed by the needle pointer 115. The main scales 121a are formed in a protruding manner at equally spaced intervals along the circumferential direction of the speedometer main scale section 121. The speedometer auxiliary scale section 122 is connected with the outside in the radial direction of the speedometer main scale section 121 and formed into a substantially annular ring. The speedometer auxiliary scale section 122 is slightly inclined with respect to the speedometer main scale section 121. The speedometer auxiliary scale section 122 is associated with the physical quantity indicated by the speedometer 102, specifically, the vehicle speed. The speedometer auxiliary scale section 122 includes a plurality of auxiliary scales 122a pointed by the needle pointer 115. The auxiliary scales 122a are formed in a protruding manner at equally spaced intervals along the circumferential direction of the speedometer auxiliary scale section 122, at intervals shorter than the intervals at which the main scales 121a are formed. The frame wall 123 is connected with the outside in the radial direction of the speedometer auxiliary scale section 122 and formed into a substantially annular ring. The frame wall 123 is slightly inclined with respect to the speedometer auxiliary scale section 122. More specifically, the frame wall 123 is inclined with respect to the speedometer main scale section 121 more sharply than the speedometer auxiliary scale section 122 is. The speedometer character display section 124 is connected with the outside in the radial direction of the frame wall 123 and formed into a substantially annular ring. The speedometer character display section 124 is inclined reversely with respect to the frame wall 123. The speedometer character display section 124 includes a plurality of character strings 124a representing measured values, specifically, the vehicle speed. The character strings 124a include "20", "40", and "60" that are formed in a protruding manner at equally spaced intervals along the circumferential direction of the speedometer character display section 124. The cylindrical end section 125 is connected with the outside in the radial direction of the speedometer character display section 124 and formed into a substantially annular ring. The cylindrical end section 125 is formed into a substantially cylindrical riser surface that folds back from the speedometer character display section 124 toward the back surface side in the depth direction along the central axis C1. It is noted that the dial plate 117 includes, for example, a mounting section 126 formed on an outer side in the radial direction of the cylindrical end section 125. The mounting section 126 is used for mounting the corresponding dial plate 117 on, for example, the housing 109.

In addition, a fuel indicator disc section 127, a fuel indicator scale section 128, and a boundary annular section 129 are formed in the dial plate 117 so as to be incorporated into portions of the center disc section 119, the boundary rising surface 120, and the speedometer main scale section 121. The dial plate 117 has a shaft hole 130 formed in an area that includes a reference line C2 that extends in parallel with the central axis C1 and that is set at a position offset (in FIG. 3, the position offset downwardly) from the central axis C1. The shaft hole 130 receives the rotational shaft of the needle pointer 115 of the fuel indicator 103 passed therethrough. The shaft hole 130 passes through the dial plate 117 in the depth direction. The shaft hole 130 is formed into a substantially circular shape about the reference line C2. The dial plate 117 includes the fuel indicator disc section 127, the fuel indicator scale section 128, and the boundary annular section 129 that are formed concentrically about the reference line C2 in sequence outwardly in the radial direction from the shaft hole 130 side into substantially annular rings. The dial plate 117 functions such that the fuel indicator disc section 127, the fuel indicator scale section 128, and the like constitute a portion corresponding to the display surface of the fuel indicator 103.

The fuel indicator disc section 127 is formed into a substantially annular ring on the outside in the radial direction of the shaft hole 130. The fuel indicator disc section 127 includes character strings 127a representing a physical quantity indicated by the fuel indicator 103, specifically, the character strings 127a such as "½", "E (the first letter of Empty), and "F (the first letter of Full), and various patterns. The fuel indicator scale section 128 is connected with the outside in the radial direction of the fuel indicator disc section 127 and formed into a substantially annular ring. The fuel indicator scale section 128 is associated with the physical quantity indicated by the fuel indicator 103, specifically, the level of fuel still available for use. The fuel indicator scale section 128 includes a plurality of scales 128a indicated by the needle pointer 115. The scales 128a are formed at equally spaced intervals along the circumferential direction of the fuel indicator scale section 128. The boundary annular section 129 is connected with the outside in the radial direction of the fuel indicator scale section 128 and formed into a substantially annular ring. The boundary annular section 129 is disposed between two different areas, one area including the center disc section 119, the boundary rising surface 120, and the speedometer main scale section 121, and the other area including the fuel indicator disc section 127 and the fuel indicator scale section 128. The boundary annular section 129 functions as a boundary between an area that functions as the display surface of the speedometer 102 and an area that functions as the display surface of the fuel indicator 103.

The dial plates 117 configured as the decorative parts 1 in the present embodiment each include the substrate body 2, the metal thin film 3, and a plurality of grooves 4. Specifically, the substrate body 2 is molded from synthetic resin. The metal thin film 3 is formed of metal and deposited on a surface of the substrate body 2 so as to provide an outer covering. The grooves 4 are formed in a surface of the metal thin film 3 in accordance with the shape of the surface of the substrate body 2. The dial plate 117 has a layered structure including the metal thin film 3 stacked on the surface of the substrate body 2. The surface of the metal thin film 3 constitutes the display surface of the dial plate 117. The grooves 4 formed in the display surface give a predetermined area a patterned decoration.

It should here be noted that the surface of each of the substrate body 2 and the metal thin film 3 is on the front surface side in the depth direction, specifically, the surface opposed to the driver's seat of the vehicle. Typically, the surface of the metal thin film 3 is visually recognized by, for example, the driver sitting in the driver's seat.

Integral molding of synthetic resin using a mold integrally molds the following elements described above of the substrate body 2: specifically, the center disc section 119, the boundary rising surface 120, the speedometer main scale section 121, the speedometer auxiliary scale section 122, the frame wall 123, the speedometer character display section 124, the cylindrical end section 125, the mounting section 126, the fuel indicator disc section 127, the fuel indicator scale section 128, the boundary annular section 129, the main scales 121a, the auxiliary scales 122a, the character strings 124a, the character strings 127a, and the scales 128a. The metal thin film 3 is deposited on the surface of the substrate body 2 so as to provide an outer covering. The grooves 4 are formed in the surface of the metal thin film 3 in accordance with the shape of the surface of the substrate body 2. In other words, the substrate body 2 has grooves 5 formed in the surface covered by the metal thin film 3 in accordance with the shape of the grooves 4 to be formed in the surface of the metal thin film 3 is deposited. During integral molding of the substrate body 2 from the synthetic resin using the mold, grooves formed in a molding surface of the mold are transferred onto the surface of the substrate body 2 to form the grooves 5.

The grooves 4 in the present embodiment form various mark patterns on the surface of the dial plate 117. Exemplarily, the dial plates 117 in the present embodiment are marked with what is called a radial mark pattern 6 and what is called a spin mark pattern 7. The radial mark pattern 6 is applied by the grooves 4 to the surfaces of the speedometer main scale section 121 and the fuel indicator disc section 127. The spin mark pattern 7 is applied by the grooves 4 to the surfaces of the speedometer character display section 124 and the fuel indicator scale section 128. The radial mark pattern 6 is formed by the fine grooves 4 extending radially from a preset reference point (e.g., a point on the central axis C1 or the reference line C2) or a point nearby the preset reference point outwardly. The radial mark pattern 6 may at times be referred to as a rising-sun pattern. The spin mark pattern 7 is formed by the fine grooves 4 extending in a concentric annular ring shape or a spiral ring shape about a preset reference point (e.g., a point on the central axis C1 or the reference line C2).

In addition, the dial plates 117 in the present embodiment further include a mirror surface 8 formed into a predetermined shape, to thereby achieve more appropriate metallic texture. The mirror surface 8 of the present embodiment is applied to the surfaces of, for example, the boundary rising surface 120, the frame wall 123, the cylindrical end section 125, and the boundary annular section 129.

The mirror surface 8 is specifically formed as follows. In a waviness curve obtained from the surface shape of the metal thin film 3 with a cutoff value defined as 250 μm, and in terms of a ratio between an amplitude Wc as an average height of a waviness waveform and a wavelength Wsm as an average length of the waviness waveform, the ratio of the wavelength Wsm to the amplitude Wc of 1 is equal to or greater than 600 and equal to or smaller than 6000, and mirror surface roughness Ra is greater than 0 and equal to or smaller than 0.35 μm. Specifically, the mirror surface 8 is formed so as to satisfy a conditional expression of (1) given below, where, in a waviness curve obtained with the cutoff value defined as 250 μm from the surface shape of the metal thin film 3, "Wc" is the amplitude Wc as the average height of the waviness waveform, "Wsm" is the wavelength Wsm as the average length of the waviness waveform, and "Ra" is the mirror surface roughness.

$$1:600 \leq Wc:Wsm \leq 1:6000 \text{ and } 0 < Ra \leq 0.35 \text{ μm} \tag{1}$$

More preferably, the mirror surface 8 is formed such that the ratio of the wavelength Wsm to the amplitude Wc of 1 is equal to or greater than 1000 and equal to or smaller than 6000, and the mirror surface roughness Ra is greater than 0 and equal to or smaller than 0.35 μm. Specifically, more preferably, the mirror surface 8 is formed so as to satisfy a conditional expression of (2) given below.

$$1:1000 \leq Wc:Wsm \leq 1:6000 \text{ and } 0<Ra \leq 0.35 \text{ μm} \quad (2)$$

Most preferably, the mirror surface 8 is formed such that the ratio of the wavelength Wsm to the amplitude Wc of 1 is equal to or greater than 1400 and equal to or smaller than 6000, and the mirror surface roughness Ra is greater than 0 and equal to or smaller than 0.30 μm. Specifically, more preferably, the mirror surface 8 is formed so as to satisfy a conditional expression of (3) given below.

$$1:1400 \leq Wc:Wsm \leq 1:6000 \text{ and } 0<Ra \leq 0.30 \text{ μm} \quad (3)$$

It is noted that the mirror surface roughness Ra may have a lower limit value that typically falls within a range feasible in terms of manufacturing.

Here, it is assumed that the waviness waveform occurring on the surface of the mirror surface 8 is as depicted in FIG. 5 and the amplitude Wc and the wavelength Wsm are indices for perceiving the waviness waveform.

As exemplarily depicted in FIG. 6, the amplitude Wc is an average height of the waviness waveform in the waviness curve obtained from the surface shape of the metal thin film 3 with the cutoff value defined as 250 μm. The amplitude Wc may be expressed by expression (A) given below, where "m" is a natural number.

$$Wc = \frac{1}{m}\sum_{i=1}^{m} Zti \quad (A)$$

The wavelength Wsm is, as exemplarily depicted in FIG. 7, an average length of the waviness waveform in the waviness curve obtained from the surface shape of the metal thin film 3 with the cutoff value defined as 250 μm. The wavelength Wsm may be expressed by expression (B) given below, where "m" is a natural number.

$$Wsm = \frac{1}{m}\sum_{i=1}^{m} Xsi \quad (B)$$

The ratio of the wavelength Wsm to the amplitude Wc of 1 is calculated from measured values of the amplitude Wc and the wavelength Wsm. The ratio of the wavelength Wsm to the amplitude Wc of 1 serves as an index for perceiving waviness and smoothness of the surface and corresponds in this specification to an index for perceiving distortion in a reflected image. The ratio of the wavelength Wsm to the amplitude Wc of 1 typically exhibits the following trend. Specifically, smaller values of this ratio cause the waviness to become sharper, resulting in increasing distortion in the reflected image and greater values of this ratio cause the waviness to become milder, resulting in decreasing distortion in the reflected image.

The dial plate 117 configured as the decorative part 1 is formed into a shape such that the ratio of the wavelength Wsm to the amplitude Wc of 1, as calculated from the measured values of the amplitude Wc and the wavelength Wsm measured under a predetermined measurement condition established in advance, satisfies any one of the conditional expressions of (1) to (3) given above.

Examples of the predetermined measurement condition established in advance for measuring the amplitude Wc and the wavelength Wsm of the surface of the mirror surface 8 include, but are not limited to, the following. Specifically, the measurements of the amplitude Wc and the wavelength Wsm are taken using a "3D measurement laser microscope LEXT OLS4000 manufactured by Olympus Corporation" as the measuring instrument and using the following procedure.

Step 1-1 Using the "3D measurement laser microscope LEXT OLS4000 manufactured by Olympus Corporation", acquire an image of the surface of the mirror surface 8 of the dial plate 117 configured as the decorative part 1 in the "imaging" mode.

Step 1-2 After having acquired the image, select the "measurement" tab on the operating screen of the "3D measurement laser microscope LEXT OLS4000 manufactured by Olympus Corporation" (hereinafter may be referred to simply as the "operating screen"), change the mode to "measurement", and select "line roughness" from the measurement modes.

Step 1-3 On the operating screen, select "X direction" (typically the direction extending to transverse, for example, the boundary rising surface 120, the frame wall 123, the cylindrical end section 125, and the boundary annular section 129) in "specify measurement line".

Step 1-4 On the operating screen, select "waviness parameter" in "analysis parameter".

Step 1-5 On the operating screen, select "250 μm" in "cutoff".

Step 1-6 On the operating screen, and in the "roughness measurement" field, select the "waviness" tab out of the tabs of "cross-section", "roughness", "waviness", and "mix". As a result, the operating screen displays, as illustrated in FIG. 8, measurement data of the waviness curve (smoother curve) that represents the measurement data of the surface of the mirror surface 8 of the dial plate 117 imaged at Step 1-1, from which wavelength components of 250 μm or shorter have been removed.

Step 1-7 On the operating screen, read numeric values of "amplitude Wc" and "wavelength Wsm" among various indices displayed in the "analysis parameter" field. The read numeric values are the measured values of "amplitude Wc" and "wavelength Wsm".

Step 1-8 Using the measured values of "amplitude Wc" and "wavelength Wsm", calculate Wsm/Wc to find the ratio of the wavelength Wsm to the amplitude Wc of 1.

The mirror surface roughness Ra is what is called arithmetic average roughness Ra. As exemplarily depicted in FIG. 9, the mirror surface roughness Ra can be expressed by expression (C) given below, when a reference length of l is sampled from a roughness curve in a direction in which an average line of the roughness curve extends, and the X-axis is taken in a direction in which the average line of the sampled portion extends and the Y-axis is taken in a direction of longitudinal magnification to thereby express the roughness curve by y=f(x).

$$Ra = \frac{1}{l}\int_{0}^{l} |f(x)|dx \quad (C)$$

The mirror surface roughness Ra serves as an index for perceiving depth (height) of finely spaced irregularities on the surface. In this specification, the mirror surface roughness Ra corresponds to an index for perceiving a degree of blurriness of the reflected image. The mirror surface roughness Ra typically exhibits the following trend. Specifically, smaller values of the mirror surface roughness Ra make the depth of the finely spaced irregularities shallower, resulting in increasing sharpness of an outline of the reflected image; while greater values of the mirror surface roughness Ra make the depth of the finely spaced irregularities deeper, resulting in an increasing degree of blurriness of the reflected image.

The dial plate 117 configured as the decorative part 1 is formed into a shape such that the mirror surface roughness Ra as calculated under a predetermined measurement condition established in advance satisfies any one of the conditional expressions of (1) to (3) given above.

Examples of the predetermined measurement condition established in advance for measuring the mirror surface roughness Ra of the surface of the mirror surface 8 include, but are not limited to, the following. Specifically, as with the case of measuring the amplitude Wc and the wavelength Wsm of the surface of the mirror surface 8, the measurements are taken using the "3D measurement laser microscope LEXT OLS4000 manufactured by Olympus Corporation" as the measuring instrument for measuring the mirror surface roughness Ra and using the following procedure.

Step 2-1 Using the "3D measurement laser microscope LEXT OLS4000 manufactured by Olympus Corporation", image the surface of the mirror surface 8 of the dial plate 117 configured as the decorative part 1 in the "imaging" mode.

Step 2-2 After imaging the image, select the "measurement" tab on the operating screen of the "3D measurement laser microscope LEXT OLS4000 manufactured by Olympus Corporation", change the mode to "measurement", and select "line roughness" from the measurement modes.

Step 2-3 On the operating screen, select "X direction" (typically the direction extending to transverse, for example, the boundary rising surface 120, the frame wall 123, the cylindrical end section 125, and the boundary annular section 129) in "specify measurement line".

Step 2-4 On the operating screen, select "roughness parameter" in "analysis parameter".

Step 2-5 On the operating screen, select "250 μm" in "cutoff".

Step 2-6 On the operating screen, and in the "roughness measurement" field, select the "roughness" tab out of the tabs of "cross-section", "roughness", "waviness", and "mix". As a result, the operating screen displays, as illustrated in FIG. 10, measurement data of the roughness curve (waviness removed) that represents the measurement data of the surface of the mirror surface 8 of the dial plate 117 imaged at Step 2-1, from which wavelength components of 250 μm or shorter have been removed.

Step 2-7 On the operating screen, read the numeric value of "arithmetic average roughness Ra" among various indices displayed in the "analysis parameter" field. The read numeric value is the measured value of the "mirror surface roughness Ra".

Forming the dial plate 117 configured as the decorative part 1 into the shape such that each of the ratio of the wavelength Wsm to the amplitude Wc of 1 and the mirror surface roughness Ra in the mirror surface 8 satisfies any one of the conditional expressions of (1) to (3) given above achieves the following. Specifically, distortion in the reflected image on the mirror surface 8 can be reduced to a degree close to distortion in the reflected image on actual metal. Additionally, for a sense of blurriness in the reflected image on the mirror surface 8, the sense of blurriness can be achieved that is close to the sense of blurriness in the actual metal.

In order for the dial plate 117 configured as the decorative part 1 to achieve the shape that satisfies any one of the conditional expressions of (1) to (3) given above, preferably, synthetic resin that exhibits high fluidity and favorable transfer performance (or, ability to follow the profile of the molding surface), specifically, a cycloolefin polymer (COP) resin, is used as the synthetic resin that forms the substrate body 2 and titanium is used as the metal that forms the metal thin film 3. Additionally, preferably, the metal thin film 3 that contains titanium is deposited through what is called sputtering on the surface of the substrate body 2 that has been molded using a mold into a predetermined shape from synthetic resin that contains the cycloolefin polymer resin.

More specifically, the substrate body 2 is molded through integral molding from the synthetic resin that contains the cycloolefin polymer resin. In this case, the mold for molding the substrate body 2 has a molding surface on which formed are not only portions where the different parts of the dial plates 117 described above (including the center disc section 119, the boundary rising surface 120, the speedometer main scale section 121, the speedometer auxiliary scale section 122, the frame wall 123, the speedometer character display section 124, the cylindrical end section 125, the mounting section 126, the fuel indicator disc section 127, the fuel indicator scale section 128, the boundary annular section 129, the main scales 121a, the auxiliary scales 122a, the character strings 124a, the character strings 127a, the scales 128a, and the mirror surface 8) are formed, but also the grooves formed in accordance with the shape of the grooves 4 that constitute the radial mark pattern 6 and the spin mark pattern 7 described above. Basic shapes corresponding to the different parts of the dial plates 117 are formed in the mold using various types of machine tools, e.g., a numerical control (NC) milling machine, on the basis of machining information including shape information of the molding surface of the mold. In this case, for the formation of the fine grooves in the molding surface of the mold in accordance with the grooves 5, the fine grooves in accordance with the grooves 5 are cut in the molding surface of the mold using various types of cutting tools, e.g., an end mill and a diamond cutting tool, instead of by etching, buffing, or grinding. The grooves formed in the molding surface of the mold are transferred onto the surface of the substrate body 2, so that the grooves 5 in accordance with the shape of the grooves 4 that constitute the radial mark pattern 6 and the spin mark pattern 7 are formed in the substrate body 2.

The metal thin film 3 is deposited on the surfaces of the substrate body 2 as to provide an outer covering through the film deposition of titanium by sputtering performed on the surfaces of the substrate body 2 on which the different parts of the dial plates 117 and the mirror surface 8 and in which the grooves 5 in accordance with the shape of the grooves 4 that constitute the radial mark pattern 6 and the spin mark pattern 7 are formed. The sputtering, as used herein, refers to a process in which a DC high voltage is applied to an inert gas, such as argon, packed in a vacuum chamber to thereby ionize the inert gas; the ionized inert gas is made to collide with a metal ingot, specifically in this case, a titanium ingot; titanium molecules/atoms as metal particles repelled from the ingot are deposited onto the surface of the substrate body 2 as a target; a titanium metal thin film 3 is thereby deposited on the surface of the target substrate body 2. The sputtering achieves relatively greater adhesion of the metal thin film 3 to the substrate body 2.

As described above, the substrate body 2 is molded using the cycloolefin polymer resin, which is synthetic resin that exhibits high fluidity and favorable transfer performance.

The molding of the substrate body 2 enables any desired shape required by, for example, the different parts of the dial plates 117 and the mirror surface 8 and the grooves 5 in accordance with the shape of the grooves 4 that constitute the radial mark pattern 6 and the spin mark pattern 7 that are formed in the molding surface of the mold to be faithfully transferred from the molding surface to the surface of the substrate body 2.

The metal thin film 3 is formed such that a film of titanium, which exhibits favorable adhesion to the substrate body 2 molded from the cycloolefin polymer resin and permits sputtering, is deposited on the surface of the substrate body 2 by sputtering. Thus, the metal thin film 3 can achieve sufficient adhesion to the substrate body 2 without the need to have, for example, an undercoat on the surface of the substrate body 2, thus reducing a chance of the metal thin film 3 separating from the substrate body 2. Formed to contain titanium, which is materially stable, the metal thin film 3 does not require, for example, a top coat on the surface thereof, either. As a result, the metal thin film 3 can be formed to be relatively thin (e.g., about 0.2 μm), so that the grooves 4 that constitute the radial mark pattern 6 and the spin mark pattern 7 can be formed without filling the grooves 5 formed in the surface of the substrate body 2.

In the decorative parts 1 (dial plates 117) described above, each of the decorative parts 1 includes the substrate body 2 molded from the synthetic resin, the metal thin film 3 that is formed of metal and deposited on the surface of the substrate body 2 so as to provide a covering, and the mirror surface 8 formed on the surface of the metal thin film 3 in accordance with the shape of the surface of the substrate body 2. The mirror surface 8 is formed such that, in the waviness curve obtained from the surface shape with the cutoff value defined as 250 μm, and in terms of the ratio between the amplitude Wc as the average height of the waviness waveform and the wavelength Wsm as the average length of the waviness waveform, the ratio of the wavelength Wsm to the amplitude Wc of 1 is equal to or greater than 600 and equal to or smaller than 6000, and the mirror surface roughness Ra is greater than 0 and equal to or smaller than 0.35 μm. More preferably, the mirror surface 8 is formed such that the ratio of the wavelength Wsm to the amplitude Wc of 1 is equal to or greater than 1000 and equal to or smaller than 6000, and the mirror surface roughness Ra is greater than 0 and equal to or smaller than 0.35 μm. Most preferably, the mirror surface 8 is formed such that the ratio of the wavelength Wsm to the amplitude Wc of 1 is equal to or greater than 1400 and equal to or smaller than 6000, and the mirror surface roughness Ra is greater than 0 and equal to or smaller than 0.30 μm. The vehicle display device 100 described above includes the display units 101 that display information relating to the vehicle and the decorative parts 1 (dial plates 117).

Thus, the decorative parts 1 (dial plates 117) and the vehicle display device 100 are each formed such that each of the ratio of the wavelength Wsm to the amplitude Wc of 1 and the mirror surface roughness Ra in the mirror surface 8 formed on the surface of the metal thin film 3 in accordance with the shape of the surface of the substrate body 2 molded by resin molding satisfies any one of the conditional expressions of (1) to (3). Distortion in the reflected image on the mirror surface 8 can therefore be reduced to a degree close to distortion in the reflected image on actual metal. Additionally, for the sense of blurriness in the reflected image on the mirror surface 8, the sense of blurriness can be achieved that is close to the sense of blurriness in the actual metal.

Thus, the decorative parts 1 and the vehicle display device 100 can reduce variations in quality thanks to their configuration of including the metal thin film 3 on the surface of the substrate body 2 as resin molding. Moreover, the decorative parts 1 and the vehicle display device 100 can reproduce texture close to texture of actual metal, despite their being resin molding. For example, the decorative parts 1 and the vehicle display device 100 can reduce manufacturing cost, compared with a case in which the decorative parts 1 are machined one by one. Additionally, compared with a case in which the whole of the decorative parts 1 is manufactured using metal, the decorative parts 1 and the vehicle display device 100 can reduce weight, thus contributing to reduction in weight of the vehicle. Thus, the decorative parts 1 and the vehicle display device 100 can achieve reduction in both cost and weight. As a result, the decorative parts 1 and the vehicle display device 100 can appropriately gain metallic texture to be given to the viewer in the configuration of including the metal thin film 3 on the surface of the substrate body 2 formed of resin. It should here be noted that, as described above, the mirror surface 8 of the boundary rising surface 120 adjacent to the speedometer main scale section 121 to which the radial mark pattern 6 is applied and the mirror surface 8 of the frame wall 123, the cylindrical end section 125, and the boundary annular section 129 adjacent to the speedometer character display section 124 and the fuel indicator scale section 128 to which the spin mark pattern 7 is applied can achieve an effect of reproducing texture close to the texture of actual metal more conspicuously, despite their being resin molding, thanks to contrast between the surfaces to which patterns of the radial mark pattern 6, the spin mark pattern 7, and the like are applied and the mirror surface 8 having no patterns.

Additionally, in the decorative parts 1 (dial plates 117) described above, the substrate body 2 is molded to contain cycloolefin polymer resin and the metal thin film 3 is formed to contain titanium. Consequently, the decorative parts 1 and the vehicle display device 100 enables a combination of the substrate body 2 and the metal thin film 3 to achieve, for example, favorable transfer performance in the substrate body 2 constituting the decorative parts 1, the ability to follow the profile through machinability and thinning of the metal thin film 3 constituting the decorative parts 1, and favorable adhesion between the substrate body 2 and the metal thin film 3. Molded to contain the cycloolefin polymer resin, the substrate body 2 enables any desired shape required by, for example, the different parts of the dial plates 117 and the mirror surface 8 and the grooves 5 in accordance with the shape of the grooves 4 that constitute the radial mark pattern 6 and the spin mark pattern 7 that are formed in the molding surface of the mold, to be faithfully transferred from the molding surface to the surface of the substrate body 2. Formed using titanium, permits thin film deposition by sputtering, the metal thin film 3 allows film thickness to be made relatively thin, and enables the grooves 4 that constitute the radial mark pattern 6 and the spin mark pattern 7 to be formed without filling the grooves 5 formed in the surface of the substrate body 2. Moreover, sufficient adhesion can be achieved between the substrate body 2 and the metal thin film 3, so that the metal thin film 3 can be prevented from being separated from the substrate body 2. Also in the foregoing respect, the decorative parts 1 and the vehicle display device 100 can appropriately gain metallic texture to be given to the viewer in the configuration of including the metal thin film 3 on the surface of the substrate body 2 formed of resin.

It is understood that the metallic decorative part for a vehicle display device and the vehicle display device according to the embodiment described above are for illustrative purpose only and are not limiting and that various changes may be made without departing from the scope of the present invention.

It has been described above that the decorative parts 1 are applied to the dial plates 117 that are incorporated in, for example, the speedometer 102, the fuel indicator 103, the tachometer 104, and the coolant temperature indicator 105, but are not limiting. The decorative parts 1 may be applied, in the vehicle display device 100, to other ornamental members for portions that are exposed on the front surface side in the depth direction and visible from the occupants including the driver. The decorative parts 1 may be applied to annular ornamental members (ring members) disposed around, for example, the facing 112, the speedometer 102, the fuel indicator 103, the tachometer 104, and the coolant temperature indicator 105.

It has been described above that the dial plates 117 have the radial mark pattern 6 applied to the surface of the speedometer main scale section 121 and the fuel indicator disc section 127, and the spin mark pattern 7 applied to the surface of the speedometer character display section 124 and the fuel indicator scale section 128. The foregoing is, however, illustrative only and not limiting. For example, the dial plates 117 may be provided with any pattern other than the radial mark pattern 6 and the spin mark pattern 7, by the grooves 4. For example, the dial plates 117 may be provided with a hairline mark pattern having vertical stripes formed by the grooves 4, a hairline mark pattern having lateral stripes formed by the grooves 4, or a mark pattern having vertical stripes crossing lateral stripes.

It has been described above that the cycloolefin polymer resin is used as the synthetic resin that forms the substrate body 2, titanium is used as the metal that forms the metal thin film 3, and the sputtering is employed to deposit the metal thin film 3 on the surface of the substrate body 2. The foregoing is, however, illustrative only and not limiting. The substrate body 2 may be molded to contain, for example, an acrylic resin or a polycarbonate (PC) resin. The metal thin film 3 may be formed to contain, for example, aluminum, stainless steel, gold, silver, platinum, copper, zinc, nickel, chrome, tin, or molybdenum. Vapor deposition, for example, may be employed as the film deposition process to deposit the metal thin film 3 on the surface of the substrate body 2.

It has been described above that the "3D measurement laser microscope LEXT OLS4000 manufactured by Olympus Corporation" is used as the measuring instrument for measuring the amplitude Wc, the wavelength Wsm, and the mirror surface roughness Ra. This measuring instrument model is illustrative only, and any other model may be used as long as the predetermined measurement condition established in advance for measuring the amplitude Wc, the wavelength Wsm, and the mirror surface roughness Ra is identical to that described above.

EXAMPLES

Figure 11:
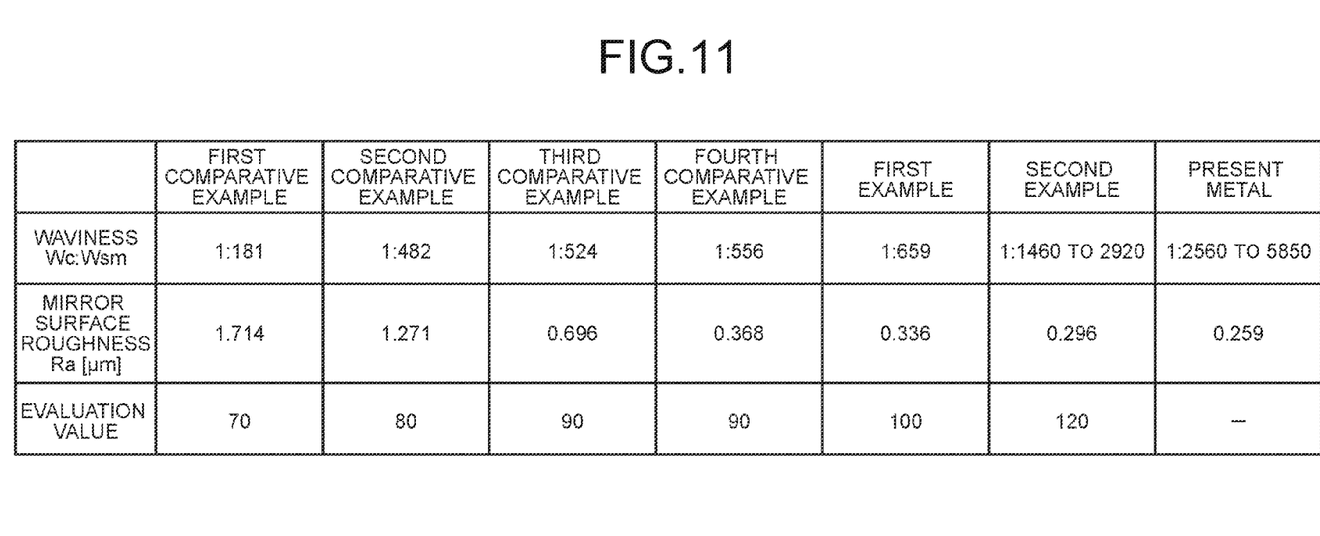
FIG. 11 is a table depicting results of a sensory evaluation test of the dial plate according to the embodiment.

FIG. 11 is a table illustrating results of a sensory evaluation test of the dial plate according to the embodiment. The following describes the sensory evaluation test of the dial plate 117 configured as the decorative part 1 with reference to FIG. 11.

The sensory evaluation test was conducted using, in the dial plate 117 configured as the decorative part 1 according to the embodiment described above, the mirror surface 8 that was actually manufactured such that the ratio of the wavelength Wsm to the amplitude Wc of 1 and the mirror surface roughness Ra satisfied any of the conditional expressions (1) to (3). In a "first example", the mirror surface 8 was manufactured such that the ratio of the wavelength Wsm to the amplitude Wc of 1 was 659 and the mirror surface roughness Ra was 0.336 μm, to thus satisfy the conditional expression (1). In a "second example", the mirror surface 8 was manufactured such that the ratio of the wavelength Wsm to the amplitude Wc of 1 was 1460 to 2920 and the mirror surface roughness Ra was 0.296 μm, to thus satisfy the conditional expressions (1) to (3). In contrast, in a "first comparative example", a "second comparative example", a "third comparative example", and a "fourth comparative example", the mirror surface 8 was actually manufactured such that the ratio of the wavelength Wsm to the amplitude Wc of 1 and the mirror surface roughness Ra did not satisfy any of the conditional expressions (1) to (3). In the "first comparative example", the mirror surface 8 was manufactured such that the ratio of the wavelength Wsm to the amplitude Wc of 1 was 181 and the mirror surface roughness Ra was 1.714 μm. In the "second comparative example", the mirror surface 8 was manufactured such that the ratio of the wavelength Wsm to the amplitude Wc of 1 was 482 and the mirror surface roughness Ra was 1.271 μm. In the "third comparative example", the mirror surface 8 was manufactured such that the ratio of the wavelength Wsm to the amplitude Wc of 1 was 524 and the mirror surface roughness Ra was 0.696 μm. In the "fourth comparative example", the mirror surface 8 was manufactured such that the ratio of the wavelength Wsm to the amplitude Wc of 1 was 556 and the mirror surface roughness Ra was 0.368 μm. In the "first example", the "second example", the "first comparative example", the "second comparative example", the "third comparative example", and the "fourth comparative example", the cycloolefin polymer resin was used as the synthetic resin forming the substrate body 2, titanium was used as the metal forming the metal thin film 3, and the sputtering was employed to deposit the metal thin film 3 on the surface of the substrate body 2, just as in the embodiment described above. In the "first example", the "second example", the "first comparative example", the "second comparative example", the "third comparative example", and the "fourth comparative example", the measured values of the amplitude Wc and the wavelength Wsm taken using the "3D measurement laser microscope LEXT OLS4000 manufactured by Olympus Corporation" and following the steps from Step 1-1 to Step 1-8 were used. In the "first example", the "second example", the "first comparative example", the "second comparative example", the "third comparative example", and the "fourth comparative example", the measured values of the mirror surface roughness Ra taken using the "3D measurement laser microscope LEXT OLS4000 manufactured by Olympus Corporation" and following the steps from Step 2-1 to Step 2-7 were used. It is noted that the mirror surface 8 of the dial plate manufactured using the present metal and in the same configuration was subjected to cutting and grinding operations and the mirror surface 8 was measured using the same method. In this case, the ratio of the wavelength Wsm to the amplitude Wc of 1 was "2560 to 5850" and the mirror surface roughness Ra was "0.259 μm".

The sensory evaluation test was conducted for the "first example", the "second example", the "first comparative example", the "second comparative example", the "third comparative example", and the "fourth comparative example" as evaluation objects using the following procedure. Specifically, evaluators made a sensory evaluation of metallic texture of each of the evaluation objects on the basis of their experience, when the evaluation objects and the present metal were placed in: (A-1) a room having no extraneous light and at predetermined positions within a prototype of the vehicle display device 100 illustrated in FIG. 1 in juxtaposition with each other; (A-2) a room having extraneous light and at predetermined positions within the prototype of the vehicle display device 100 illustrated in FIG. 1 in juxtaposition with each other; (B-1) a room having no extraneous light, and at predetermined positions within a box having an acrylic top plate (something like an exhibition case) in juxtaposition with each other and with all areas surrounding all but the evaluation objects covered in a black cloth; and (B-2) a room having extraneous light, and at predetermined positions within a box having an acrylic top plate in juxtaposition with each other and with all areas surrounding all but the evaluation objects covered in a black cloth. The evaluators finally made an overall evaluation for a combination of all of (A-1), (A-2), (B-1), and (B-2). The evaluation value was rated as "100" when sufficient metallic texture was sensed with no deliberate intention evident to achieve the sufficient metallic texture as compared with the present metal, and rated as "less than 100" when sufficient metallic texture was not sensed with some deliberate intention evident to achieve the sufficient metallic texture as compared with the present metal. Greater evaluation values above "100" signify an increasing sense of metallic texture, and smaller evaluation values below "100" signify a decreasing sense of metallic texture. Designers of the vehicle display devices (meters) formed a group of five evaluators and the evaluation value was an average value of the evaluation values rated by the five evaluators. The sensory evaluation test was conducted for each of the evaluation objects.

As evident from results of the sensory evaluation test listed in FIG. 11, in the comparative examples in which the "first comparative example" was rated "70", the "second comparative example" was rated "80", the "third comparative example" was rated "90", and the "fourth comparative example" was rated "90", the sufficient metallic texture was not sensed with some deliberate intention evident to achieve the sufficient metallic texture as compared with the present metal; in contrast, in the examples of the present invention in which the "first example" was rated "100" and the "second example" was rated "120", the sufficient metallic texture was sensed with no deliberate intention evident to achieve the sufficient metallic texture as compared with the present metal. Moreover, even with the "first example" and the "second example", evidently, greater values of the ratio of the wavelength Wsm to the amplitude Wc of 1 cause the distortion in the reflected image to be smaller, and smaller values of the mirror surface roughness Ra cause the outline of the reflected image to become sharper, resulting in an enhanced sense of metallic texture. Further evidently, the "second example" exhibits the highest sense of metallic texture. As such, evidently, the "first example" and the "second example" can appropriately gain metallic texture to be given to the viewer in the configuration of including the metal thin film 3 on the surface of the substrate body 2 formed of resin and are provided with appearance close to metal.

The metallic decorative part for a vehicle display device, and the vehicle display device according to the present invention, are formed to have the mirror surface that is formed on the surface of the metal thin film in accordance with the shape of the surface of the substrate body molded through resin molding, such that the ratio of the wavelength to the amplitude of 1 is equal to or greater than 600 and equal to or smaller than 6000, and the mirror surface roughness is greater than 0 and equal to or smaller than 0.35 μm. Distortion in the reflected image on the mirror surface can thus be reduced to a degree close to distortion in the reflected image on actual metal. Additionally, for the sense of blurriness in the reflected image on the mirror surface 8, the sense of blurriness can be achieved that is close to the sense of blurriness in the actual metal. Thus, the metallic decorative part for a vehicle display device, and the vehicle display device can reduce variations in quality thanks to their configuration of including the metal thin film on the surface of the substrate body as resin molding. Moreover, the metallic decorative part for a vehicle display device, and the vehicle display device can reproduce texture close to texture of the actual metal, despite their being resin molding. As a result, the metallic decorative part for a vehicle display device, and the vehicle display device can achieve the effect that, in the configuration of including the metal thin film on the surface of the substrate body formed of resin, metallic texture to be given to the viewer can be appropriately achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A metallic decorative part for a vehicle display device, the metallic decorative part comprising:
   a substrate body molded from synthetic resin;
   a metal thin film that is formed of metal and deposited on a surface of the substrate body; and
   a mirror surface that is formed on a surface of the metal thin film in accordance with a surface shape of the substrate body, wherein
   the mirror surface is formed such that, in a waviness curve obtained from the surface shape of the mirror surface with a cutoff value of 250 μm, a ratio of a wavelength to an amplitude, when the amplitude is 1, is equal to or greater than 600 and equal to or smaller than 6000, and mirror surface roughness of the mirror surface is greater than 0 and equal to or smaller than 0.35 μm, the amplitude being an average height of a waviness waveform in the waviness curve and the wavelength being an average length of the waviness waveform.

2. The metallic decorative part for a vehicle display device according to claim 1, wherein
   the mirror surface is formed such that the ratio of the wavelength to the amplitude, when the amplitude is 1, is equal to or greater than 1000 and equal to or smaller than 6000, and the mirror surface roughness of the mirror surface is greater than 0 and equal to or smaller than 0.35 μm.

3. The metallic decorative part for a vehicle display device according to claim 2, wherein
   the mirror surface is formed such that the ratio of the wavelength to the amplitude, when the amplitude is 1, is equal to or greater than 1400 and equal to or smaller than 6000, and the mirror surface roughness of the mirror surface is greater than 0 and equal to or smaller than 0.30 μm.

4. The metallic decorative part for a vehicle display device according to claim 1, wherein the mirror surface is formed such that the ratio of the wavelength to the amplitude, when the amplitude is 1, is equal to or greater than 1400 and equal to or smaller than 6000, and the mirror surface roughness of the mirror surface is greater than 0 and equal to or smaller than 0.30 µm.

5. A vehicle display device, comprising:
a display unit that displays information relating to a vehicle;
a metallic decorative part for a vehicle display device that includes a substrate body molded from synthetic resin; a metal thin film that is formed of metal and deposited on a surface of the substrate body; and a mirror surface that is formed on a surface of the metal thin film in accordance with a surface shape of the substrate body, wherein
the mirror surface is formed such that, in a waviness curve obtained from the surface shape of the mirror surface with a cutoff value of 250 µm, a ratio of a wavelength to an amplitude, when the amplitude is 1, is equal to or greater than 600 and equal to or smaller than 6000, and mirror surface roughness of the mirror surface is greater than 0 and equal to or smaller than 0.35 µm, the amplitude being an average height of a waviness waveform in the waviness curve and the wavelength being an average length of the waviness waveform.

* * * * *